March 26, 1940.                R. TORPIN                2,194,990
ROENTGENPELVIMETER
Filed March 10, 1939
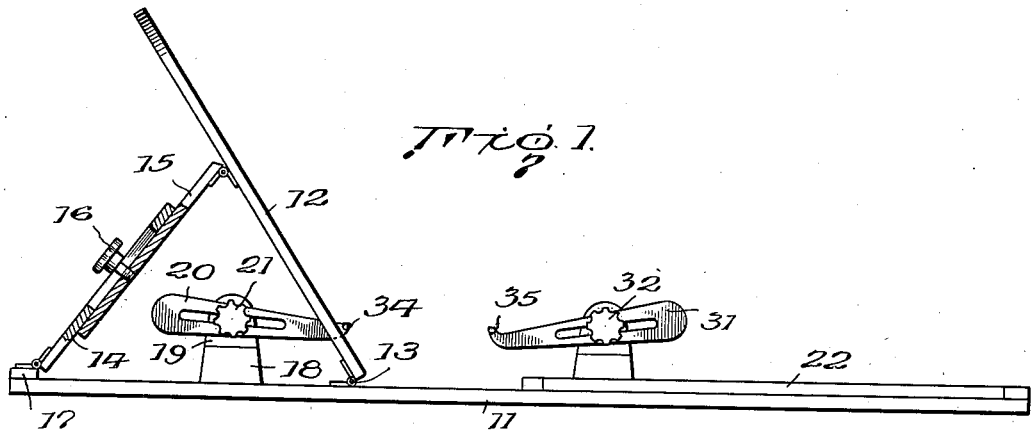
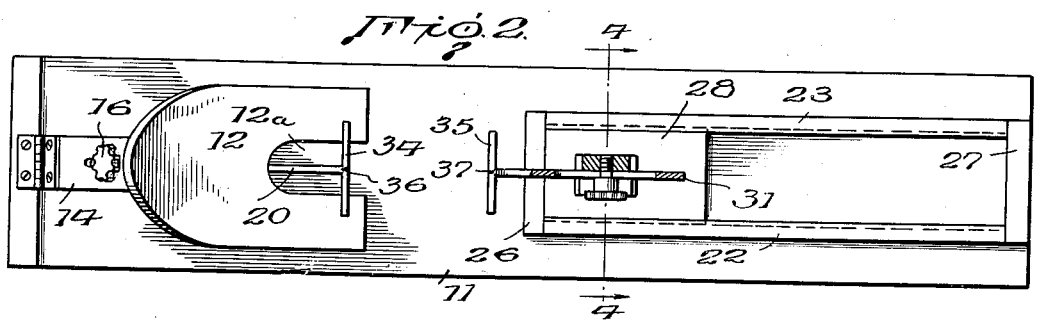
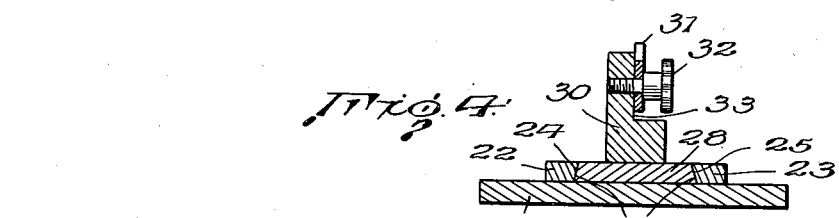
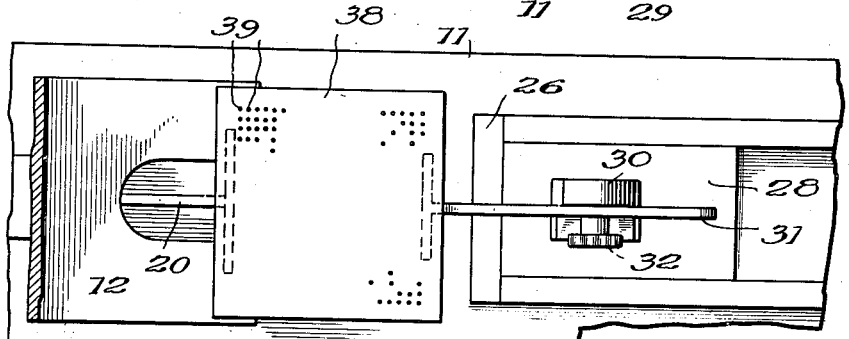
Inventor
Richard Torpin,
By Church & Church
Attorneys

Patented Mar. 26, 1940

2,194,990

UNITED STATES PATENT OFFICE 2,194,990

ROENTGENPELVIMETER

Richard Torpin, Augusta, Ga.

Application March 10, 1939, Serial No. 261,111

3 Claims. (Cl. 250—59)

This invention relates to apparatus for facilitating the determination of the size and relative position of internal parts of the body, or of other objects therein, and more particularly to a roentgenpelvimeter for facilitating accurate determination of the size and relationship of the parts shown upon a Roentgen-ray radiograph of the pelvic region.

The primary object of the invention is to provide a device for use in making Roentgen-ray radiographs of the pelvic region preparatory to childbirth, in order to determine exactly the dimensions of the birth canal, or pelvic inlet, and to obtain with perfect accuracy other data which will enable the physician to determine in advance the conditions which may develop, particularly during labor, and be able to act with full knowledge of any problems which may be presented.

Further objects of the invention are to provide such a device which is of simple construction, which is durable and which can be economically manufactured. A still further object is to provide such a device which may be used with a minimum of discomfort and inconvenience to the patient, and which will facilitate the work of the operator.

Other objects of the invention, as well as the construction and normal method of using the device, and other uses thereof, will be apparent from the following specification when considered in conjunction with the accompanying drawing, in which:

Figure 1 is a view in side elevation of a structure embodying the invention;

Fig. 2 is a view in plan of the structure shown in Fig. 1;

Fig. 3 is an enlarged, fragmentary view in plan of part of the structure shown in Figs. 1 and 2, and showing the perforated dimension plate in place thereon; and Fig. 4 is a view in transverse, vertical section, taken on the line 4—4 of Fig. 2.

It has been a known practice heretofore to make a Roentgen-ray radiograph of the human body and then to make a second exposure, upon the same negative, of a dimension member or members of which the dimensions and spacing of points thereof are accurately known, whereby upon the single negative or radiograph there would appear both the anatomical structure under investigation and spots corresponding to the points, the spacing and location of which are accurately known. Errors in the measurement of the anatomical structure have ensued, however, either because the dimensions had to be computed, or because the points of known spacing were not located, when photographed, exactly in the same plane as had been the anatomical structure which it was desired to measure.

In general, the structure embodying the present invention comprises a base member upon which the patient is positioned, and two plane-defining members adjustably supported on said base members and having thereon end portions which may be brought to those definite points on the patient's body which define the center line of the birth canal, or other line in the plane within which it is desired to know definite measurements, at least one of such members being so mounted that it may be readily moved from its adjusted position to facilitate removal of the patient after a first exposure of the Roentgen-ray negative, and may be brought back quickly to exactly the same position to which it had been previously adjusted, so that a plate of lead or other material impervious to Roentgen-rays, but having therein small openings of known spacing, may be supported on the ends of such members and therefore will be, during the later exposure, exactly in the plane of the birth canal or other desired plane, whereby the resulting negative or radiograph will show the anatomical structure and straight rows of small dots, the dots in each row being uniformly spaced, and the rows being similarly spaced by the same distance.

As shown in the drawing, the embodiment of the invention comprises a base member formed of a horizontal portion 11, and an inclined portion 12 hinged to the horizontal portion at 13, an adjustable support being provided by which the inclined portion 12 may be held fixed at any desired angular position. An opening 12a is provided in the member 12 at its lower edge for a purpose which will later appear. As shown, such adjustable support is formed by overlapping members 14 and 15 hingedly connected to the rear end of the horizontal portion 11 and to the inclined portion 12, respectively, and a set screw 16 threadedly mounted in the member 15 and passing through a slot in the member 14, with an enlarged head for engagement with the upper surface of the member 14 to hold such members in adjusted position. The support member 14 is hinged to a plate 17 which is fixedly secured to the horizontal portion 11 of the base member. Fixedly mounted upon the base member 11, under the inclined portion 12, is a pedestal or standard 18, the upper end of which is formed with a flat surface 19 which is substantially in the longitudinal central plane through the base member 11 and the inclined portion 12. A slotted arm 20 is pivotally and slidably mounted upon the pedestal 18, such arm having a slot 20a therein through which a set screw 21 passes laterally and is threaded in the pedestal, such set screw 21 having an enlarged head for engaging the side of the arm 20 to clamp it in adjusted position against the flat surface 19.

Near the forward end of the horizontal base member guiding means are provided, consisting, as shown, of parallel strips 22 and 23 beveled on their inner facing edges at 24 and 25, their ends being joined together by cross pieces 26 and 27, such strips and cross pieces being secured to the base member 11 by screws or similar means. A sliding base 28 is provided which is beveled at its side edges as shown at 29 so as to fit between and underlie the beveled edges of the guide strips 22 and 23 and be held thereby from upward movement while being slidable relatively thereto from one cross piece to the other.

A pedestal 30 is rigidly mounted upon the base 28, and may be formed integrally therewith if desired. A slotted arm 31 is pivotally and slidably mounted upon the pedestal 30, such arm having a slot 31a therein through which a set screw 32 passes laterally and is threaded in the pedestal 30, such set screw having an enlarged head for engaging the side of the arm 31 to clamp it against the flat side face 33 of the pedestal, after such arm has been adjusted longitudinally and angularly to the desired position.

The adjustably mounted arms 20 and 31 are substantially identical. Short cross pieces 34 and 35 are provided on the arms 20 and 31, respectively, at the adjacent ends of such arms, the central point of such cross pieces being preferably indicated in a suitable manner, as by short grooves 36 and 37 in the upper, flat surfaces thereof.

The opposed grooves 36 and 37 constitute indicating points which are brought exactly into horizontal alinement with those points on the patient's back and pubic bone, respectively, which are in the plane of the pelvic inlet, or so-called "superior strait," and the flattened upper surfaces of the cross pieces 34 and 35 constitute means for accurately positioning and supporting a thin plate 38 of lead, or other material impervious to Roentgen-rays, having therein a plurality of parallel rows of small perforations 39, the perforations in each row being uniformly spaced, for instance by one centimeter, and the rows being spaced from each other by the same distance.

In using the device, the base 28, with the pedestal 30 and arm 31, is moved back out of the way and the patient sits upon the base member portion 11 with her back in engagement with the inclined portion 12. It is usually preferable, as a preliminary step, to indicate by small spots upon the patient's body the points upon the back and upon the pubic bone which define the line of the center of the superior strait or birth canal, or of the corresponding line of such other plane in which it may be desired to know definite measurements. By adjusting the inclined back portion 12 of the base member the patient preferably is brought to a position in which the spots are brought to about the same height above the horizontal portion 11 of the base member.

The sliding base 28 is moved forward into contact with the cross piece 26, and the points 36 and 37 are adjusted into line with and very close to, or in contact with, the line-defining points or spots upon the patient's body. It will be noted that the arm 20 projects through the opening 12a in the inclined portion 12, and that the cross piece 34 is in front of the inclined portion 12, but such opening 12a affords ample view of the back of the patient to permit accurate positioning of the cross piece 34.

While the cross pieces 34 and 35 and points 36 and 37 thereon are so adjusted the exposure is made, in accordance with the usual standard practice, or with such variations therefrom as may be desired, the Roentgen tube being usually 32 to 36 inches above the plane defined by the cross pieces 34 and 35, and centered between them, and the plate or film being underneath the patient. The sliding base 28 is then retracted out of the way, by sliding it along the guide strips 22 and 23 without disturbing the adjustments and, after the patient is removed, the sliding base 28 is returned into its previous position, into engagement with cross piece 26, whereby the cross piece 35, with point 37 thereon, is returned exactly to its former position. The dimension plate 38 is then placed upon the flat upper surfaces of the cross pieces 34 and 35, care being taken to see that it is not tilted laterally, and a second exposure of short duration is made upon the same negative. The resulting radiograph shows the desired details of anatomical structure, upon which showing there also appear parallel rows of small black dots. It will be appreciated that, even though the holes in plate 38 are spaced by exactly one centimeter, the dots will not be spaced by exactly one centimeter, and will not be spaced from each other by exactly the same distance over the whole area, because of the divergence of the rays, because of the fact that the negative was farther from the source of the rays than was the dimension plate, and because the amount of divergence is greater as to openings near the edge of the plate than as to those near the center of the plate.

In determining the dimension in the central plane of the superior strait between any two points shown on the radiograph it is only necessary to count the spaces between dots, as each space corresponds to one centimeter in such plane, suitable estimate being made of any parts of the end spaces in which such point or points are located on the radiograph. It will be apparent that, by use of the present device, the radiographs will show not only the other details under investigation but that at a glance a very accurate estimate of dimensions can be made therefrom without any measurement or complicated calculation.

While one embodiment of the invention has been shown and described, it will be understood that changes in size and other details of the parts can be made within the scope of the invention, which invention is defined by the following claims.

What is claimed is:

1. Apparatus for use in indicating upon Roentgen-ray radiographs images corresponding to a scale in a predetermined plane, comprising a body-supporting table including a base portion, an inclined portion angularly adjustable relative to said base portion, and means for securing said inclined portion in adjusted position, a member slidably mounted on said base portion for movement toward and from said inclined portion, a pair of opposed arms mounted respectively upon said base portion and upon said slidable member, the adjacent ends of said arms being adjustable relative to each other and in a vertical plane relative to said base portion, and a plate of material impervious to Roentgen-rays, and having therein a series of uniformly spaced openings, adapted to be supported upon the adjacent ends of said arms.

2. Apparatus for use in indicating upon Roentgen-ray radiographs images corresponding to a scale in a predetermined plane, comprising a body-supporting table including a base portion, an inclined portion angularly adjustable relative to said base portion and means for securing said inclined portion in adjusted position, said inclined portion having an opening therethrough, an arm adjustably supported upon said base portion and having its forward end projecting through said opening, a member slidably mounted upon said base portion for movement toward and from said inclined portion, and an arm adjustably supported upon said slidable member, at least one of said arms having a terminal portion at its end nearest to the other of said arms extending laterally in both directions from the center of such arm.

3. A scale-supporting means for use in producing radiographs, comprising the combination of a body-supporting table including a base portion, an inclined portion angularly adjustable relative to said base portion and means for securing said inclined portion in adjusted position, said inclined portion having an opening therethrough, a member slidably mounted upon said base portion for movement toward and from said inclined portion, a standard extending upwardly from said base portion back of said inclined portion and in line with said opening, a standard extending upwardly from said slidable member, a pair of slotted arms each mounted upon one of said standards, each of said arms being slidably and angularly adjustable relative to its standard and having means for holding it in adjusted position, at least one of said arms having at its end nearest the other of said arms a terminal widened upper portion.

RICHARD TORPIN.